March 25, 1924.
D. H. PARKER
HARVESTER ATTACHMENT
Filed July 20, 1920
1,487,882
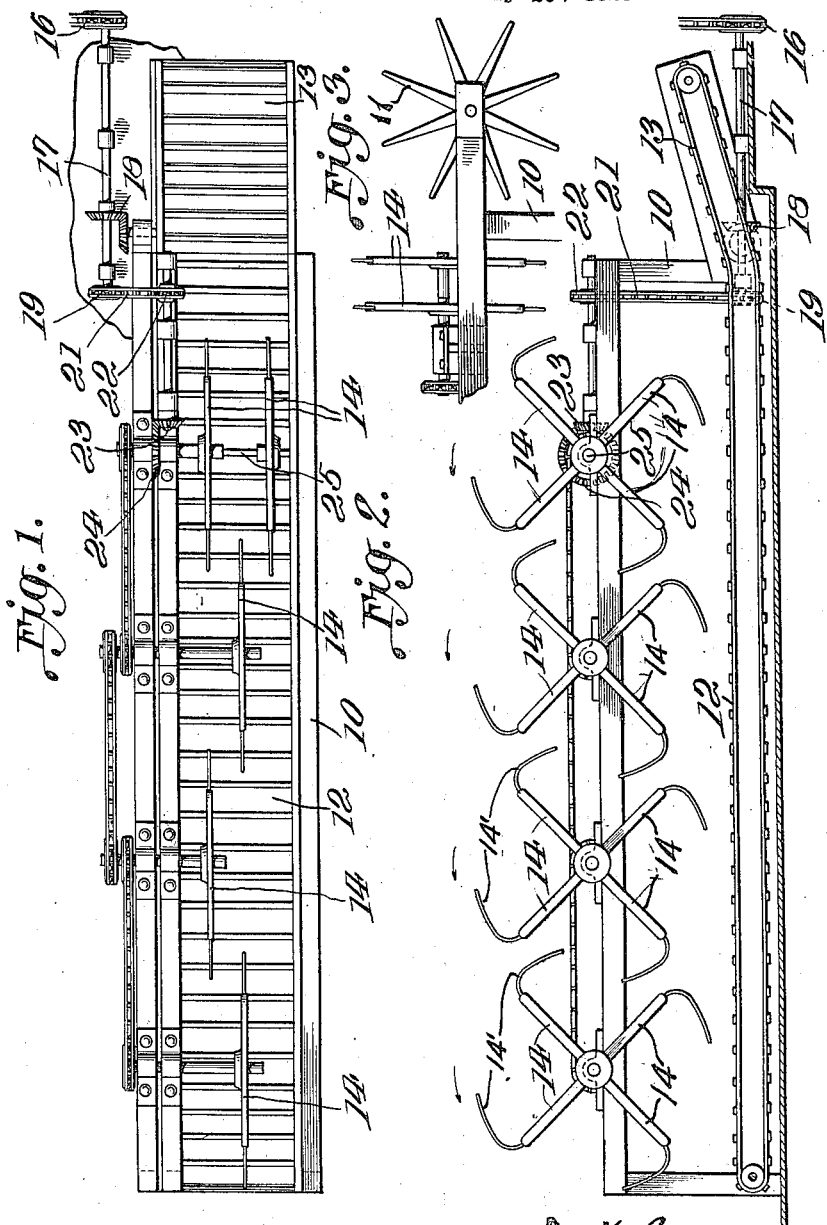
INVENTOR.
BY ATTORNEY.

Patented Mar. 25, 1924.

1,487,882

UNITED STATES PATENT OFFICE.

DELBERT H. PARKER, OF PRESCOTT, WASHINGTON.

HARVESTER ATTACHMENT.

Application filed July 20, 1920. Serial No. 397,639.

*To all whom it may concern:*

Be it known that I, DELBERT H. PARKER, a citizen of the United States, residing at Prescott, in the county of Walla Walla and State of Washington, have invented certain new and useful Improvements in Harvester Attachments; and I do hereby declare the following to be a full, clear, and exact description of the invention, such as will enable others skilled in the art to which it appertains to make and use the same.

My invention relates to an attachment to grain headers and harvesters and especially to "combined" harvesters. Its object is to provide a device which shall insure the forwarding of the grain and weeds toward the elevating end of the platform draper and up the elevating drapers.

To this end my invention comprises the parts and combinations recited in the appended claims.

In the accompanying drawing, Figure 1 is a plan view; Fig. 2 a combined section and side elevation; and Fig. 3 is a detail showing the relation of the reel to the other parts.

The customary frame is illustrated at 10, the sickle (not shown) running just above 10 in Fig. 1 and even with the top of the draper 12 in Fig. 2. The usual draper or conveyor with the customary cleats is shown at 12, the elevating part being illustrated at 13.

It will be understood that the reel 11, shown in Figure 3, extends above the sickle and just forward of the draper sweeping the grain or grain and weeds over the sickle and on to the draper at the side or front thereof. The reel is not illustrated in Figs. 1 and 2, to prevent the concealment of the other parts of the drawing. The draper, sickle and reel, are of the type employed on standard harvesters and patent to Brammer No. 745,035 of November 24, 1903 illustrates an arrangement of these elements.

In harvesting grain and weeds and especially in a country where mustard is prevalent, it is found that the draper does not carry along the grain and weeds, which therefore clog up the reel or draper or both and have to be removed by hand and lost. My improvement provides for bearing down the mustard or other weeds or grain upon the draper so that the combined product may be pressed down completely and at the same time the beaters rotating in the direction shown by the arrows in Fig. 2 press the grain forward and assist the draper in carrying the grain and weeds to the elevating draper, rendering it possible for the grain and weeds to reach the elevating draper and for the draper to carry up the combined mass, or, if there should be two elevating drapers to render it possible for the grain and weeds to move upwards between them.

This is especially useful in treating mustard because the mustard is a bushy plant, and when cut with the wheat the result is that but little of the grain or weeds actually touches any part of the platform draper which slips ineffectively beneath the grain and weeds and as more grain and weeds are cut the space behind the reel clogs up, the reel fills with grain and weeds and the machine can not be operated until the accumulation is removed by hand, and thus a large portion of it is lost.

I have illustrated a series of beaters, two being shown at the forward end of the draper 12. Each beater arm 14 carries at the end a curved steel projection 14' to press down the bushy weeds. The beaters rotate in the direction shown by the arrows in Fig. 2. The number of beaters is not necessarily limited to the number shown in the drawings, but this number is shown because deemed sufficient for ordinary use. More can be used at any point. These beaters have projected arms 14 arranged like the spokes of a wheel and are situated at such distance apart that the arms on one beater extend past the arms of the next beater and the arms are so placed that when an arm of a beater is rising from the grain, the arm of the next inner one passes it downward and prevents it from carrying any grain or weeds around on the arm and pushes the grain and weeds forward upon the platform draper while the inner beaters force the grain and weeds up the elevating draper.

16 represents a chain for applying power to a shaft 17, a pinion 18 and a sprocket wheel 19. The pinion 18 is provided to operate the sickle which is in front of the upper part of the platform draper at 12 in Fig. 2. It and the connecting mechanism have not been shown because the sickle and the mode of driving it are no part of this invention.

The sprocket wheel 19 by a chain 21 operates a sprocket wheel 22 on a shaft which carries at its end a pinion 23 to engage and rotate a crown wheel 24 on a shaft 25 carrying the two forward beaters. The shaft 25 has at its outer end a sprocket wheel which, through a chain, drives a succeeding wheel on another shaft rotating an adjacent beater, and this shaft bears a sprocket wheel which in the same manner operates a shaft bearing the next beater, and so on, so that these various beaters are brought into action in the same manner. It is not essential that the beaters be driven by sprocket wheels and chains, but any manner of transmitting power may be used. The use of sprocket wheels and chains is adopted because deemed most practicable, as it permits use of different sizes of sprocket wheels so that the speed of the rotation of the beaters can be changed to meet different conditions of grain and weeds.

The curved steel projections at the ends of the beater arms are made sufficiently flexible so that they can be bent and the diameter of the beaters and their distance from the platform draper can be varied according to the conditions met with.

An advantage claimed for this invention is that the beaters are open so that the operator of a header can see through the beaters to the sickle and be able to know when to raise and lower the sickle to meet the conditions of the ground and grain.

The distance the beaters are set is not necessarily fixed, but by varying the length of the shaft upon which they are placed they can be placed at such distance as best meets the conditions in which they are used.

I claim:—

1. An attachment for a harvester comprising a draper, a series of beaters arranged above the draper, with the beaters overlapping so as to prevent mixed mass of grain and weeds from being carried around on the beaters.

2. An attachment for a harvester comprising a draper on which grain and weeds are carried, having a series of beaters arranged thereabove, each having arms arranged as in the spokes of a wheel, with means for rotating the same so that when an arm of the outer beater rises, the arm of the next inner beater passes it as said arm of the inner beater moves downwardly and thereby prevents the grain and weeds from being carried around on the beaters.

3. In a harvester, the combination with a draper on which grain and weeds is delivered at one side, of a series of beaters arranged above the draper and in a position to engage the grain and weeds as they are delivered at the side of the draper and force them down upon the draper.

4. In a harvester, the combination with a draper on which grain and weeds is delivered at one side, of a series of rotary beaters journaled transversely of and above the draper, said beaters being arranged to engage the grain and weeds as they are delivered at the side of the draper and force them down upon the draper, and means for rotating the beaters.

5. In a harvester, the combination with a draper, a reel located along a side of the draper, of a plurality of beaters arranged above and along the length of the draper to engage the grain and weeds as they are delivered to the draper by the reel and press them down upon the draper.

In testimony whereof I affix my signature.

DELBERT H. PARKER.